United States Patent
Larsen et al.

(10) Patent No.: US 9,388,848 B2
(45) Date of Patent: Jul. 12, 2016

(54) RADIAL GAS FOIL BEARING

(71) Applicant: SIEMENS AKTIENGESELLSCHAFT, München (DE)

(72) Inventors: Jon Steffen Larsen, Dänemark (DK); Joergen Lyquist, Alsgarde (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/425,080

(22) PCT Filed: Sep. 6, 2013

(86) PCT No.: PCT/EP2013/068457
§ 371 (c)(1),
(2) Date: Mar. 2, 2015

(87) PCT Pub. No.: WO2014/037496
PCT Pub. Date: Mar. 13, 2014

(65) Prior Publication Data
US 2015/0233415 A1    Aug. 20, 2015

(30) Foreign Application Priority Data

Sep. 6, 2012  (EP) ..................................... 12183269

(51) Int. Cl.
*F16C 32/06* (2006.01)
*F16C 17/02* (2006.01)
*F16C 43/02* (2006.01)

(52) U.S. Cl.
CPC ............... *F16C 17/024* (2013.01); *F16C 43/02* (2013.01); *Y10T 29/49639* (2015.01)

(58) Field of Classification Search
CPC .. F16C 17/024; F16C 43/02; Y10T 29/49639
USPC ......................................... 384/103, 104, 106
See application file for complete search history.

(56) References Cited

U.S. PATENT DOCUMENTS 4,208,076 A    6/1980 Gray
4,274,683 A    6/1981 Gray
(Continued)

FOREIGN PATENT DOCUMENTS

DE    2747399 A1    4/1979
EP    2412994 A2 *  2/2012    ............ F16C 17/024

OTHER PUBLICATIONS

International Search Report for International Application No. PCT/EP2013/068457, mailed on Nov. 4, 2013; 3 pages.
(Continued)

*Primary Examiner* — Phillip A Johnson
(74) *Attorney, Agent, or Firm* — Schwegman, Olsen & Watts, LLP

(57) ABSTRACT

A radial gas foil bearing extending along a rotation axis including a carrier element provided with an opening extending along the axis, further including at least one foil extending circumferentially along a radial inner side of the opening of the carrier element, wherein the foil is attached to the carrier element is provided. In order to enable an easy manufacturing as well as safe operation it is proposed to provide at least one radial through hole in the carrier ring, wherein at least one fixation section of the foil is formed to be inserted into the through hole, wherein the fixation section and the through hole are made such that fixation section becomes by insertion into the through hole accessible from radial outside of the carrier element to be fixed to the carrier element.

13 Claims, 3 Drawing Sheets

(56) References Cited

U.S. PATENT DOCUMENTS

| | | |
|---|---|---|
| 4,295,689 A | 10/1981 | Licht |
| 4,296,976 A | 10/1981 | Heshmat |
| 4,552,466 A | 11/1985 | Warren |
| 5,911,511 A * | 6/1999 | Saville .................. F16C 17/024 384/103 |
| 6,158,893 A | 12/2000 | Heshmat |
| 7,648,279 B2 * | 1/2010 | Struziak ................ F16C 17/024 384/103 |
| 2005/0013515 A1 * | 1/2005 | Nakata .................. F16C 37/002 384/103 |
| 2005/0163407 A1 | 7/2005 | Kang et al. |
| 2008/0267543 A1 * | 10/2008 | Wade .................... F16C 17/024 384/106 |
| 2008/0310779 A1 | 12/2008 | Agrawal |

OTHER PUBLICATIONS

International Preliminary Report on Patentability for PCT Application No. PCT/EP2013/068457, mailed on Sep. 6, 2012.

* cited by examiner

RADIAL GAS FOIL BEARING

CROSS-REFERENCE TO RELATED APPLICATIONS

This application claims priority to PCT Application No. PCT/EP2013/068457, having a filing date of Sep. 6, 2013, based off of EP 12183269.5 having a filing date of Sep. 6, 2012, the entire contents of which are hereby incorporated by reference.

FIELD OF TECHNOLOGY

The following relates to a radial gas foil bearing extending along a rotation axis comprising at least one for foil extending circumferentially along a radial inner side of a carrier element wherein said foil is attached to said carrier element.

BACKGROUND

Gas foil bearings can be used for various machine types to support shafts rotating at high speeds. A preferred application of the gas foil bearings according to embodiments of the invention are radial bearings for a compressor rotating preferably at speeds between 10000 and 50000 RPM.

In this field of technology, several bearings types are known, for example oil lubricated radial ball bearings, oil lubricated journal bearings, active magnetic bearings and gas foil bearings. Embodiments of the invention deal with the latter. The gas foil bearing comprises normally a thin smooth radially inner surface layer and a bump foil radially outer surface layer, which allows for damping and thermal growth, centrifugal growth and compensation of miss-alignment of the shaft especially during high speed operation. Conventional gas foil bearings often can not cope with unbalance and misalignment resulting in excessive rotor vibrations. This can be a major problem for an especially radial gas foil bearing applied to a rotor of a compressor comprising an impeller with heavy aerodynamic load imposing additional dynamic forces to the gas foil bearings.

A gas foil bearing of the incipiently mentioned type for a centrifugal turbo blower is known from the patent applications US 2005/0163407A1, U.S. Pat. No. 4,208,076 A1, U.S. Pat. No. 4,274,683 A1, U.S. Pat. No. 4,296,976 A1, U.S. Pat. No. 6,158,893 A1. Except for the first previously mentioned patent applications, each document proposes to weld the foils to the carrier element. The first document proposes to insert one foil end respectively into a groove extending axially on the radial inner surface of the carrier element. While this solution to weld one foil end to the carrier element has the disadvantages of welding being a further manufacturing step and altering the material properties of the foils as a heat treatment, the known non-welding method to fix the foils to the carrier element as proposes in the first patent application mentioned has safety disadvantages. The conventional non-welding method goes along with the risk that the insertion of the foils into the groove is not sufficiently strong to avoid the foils getting loose. To avoid loosening of the foils further complex key-solutions must be provided which in most cases do not satisfy a requirement to a radial fixation or is complicated and expensive to manufacture.

The U.S. Pat. No. 4,295,689A1 shows a foil bearing comprising one metal sheet only which works for very small unit. The proposed design doesn't allow the fixation of more foils.

SUMMARY

An aspect relates to enabling easy manufacturing of a gas foil bearing of the incipiently mentioned type which can be operated safely.

A further aspect avoids loosening of foils from the carrier element during transport, assembly or operation.

Terms as radial axial, circumferential refer to the central axis of the bearing if not indicated otherwise. Said central axis coincides with a rotor axis of a rotor supported by the bearing according to embodiments of the invention.

With regard to embodiments of the invention, the terms axial, radial and circumferential always refer to a rotational axis of a shaft to be supported by the radial gas foil bearing respectively an axis, which extends through the centre of the opening.

The carrier element—which can also be referred to as a bearing ring—according to embodiments of the invention is a supporting part carrying the bump foil layer and the flat surface layer similar to a bearing journal. The carrier element is provided with an opening, through which the shaft of a rotor extends, wherein the carrier element supports the rotor by means of a bearing at this axial location. This opening is basically of a round cylindrical shape and the bump foil layer and the flat surface layer are positioned at the radial inner surface of this opening. The inner surface of the opening of the carrier element faces the centre of the opening, which is located on or near a rotational axis of the shaft of the rotor to be supported, which in most cases coincides with the so called machine axis. The carrier element can be an annular part of one piece or with an axially extending split plane.

According to embodiments of the invention, the manufacturing and assembly of a gas foil bearing is simplified, since said foil layers respectively at least one bump foil and a top foil can be positioned in the carrier element opening and afterwards fixed from the outside of said carrier element.

Such a fixation can be done by inserting of keys into said through holes to lock said fixation section of said foil circumferentially and radially.

A preferred embodiment of the invention provides said fixation section comprising a fixation section flap, which can be bend into circumferential direction to secure said fixation section in said through hole.

A bending can also be one in any other direction but circumferential direction, for example, in axial direction. Bending in circumferential direction of said fixation section flap however uses the mechanical characteristic of the flat shape of the foil advantageously.

One further preferred embodiment provides at least to fixation sections and a corresponding identical number of through holes, wherein each fixation section is inserted into one through hole. In case of several foils being layered in radial succession preferably each foil comprises at least one fixation section being inserted in one through hole. Several fixation sections of several foils can be inserted into one neutral through hole. Preferably at least three through holes are provided and each foil comprises three fixation sections of which each single one is inserted into one through hole.

To provide the easiest and best fixation possible more than one through hole and an identical number of fixation section per foil is provided, wherein in each through hole one fixation section of each foil is inserted and a flat section of each fixation section is bend over to lock said fixation section radially in said through hole. Preferable said fixation section flaps are bent over in different preferably circumferential direction to provide fixation even under varying circumferential and radial forces.

A preferred embodiment of the radial gas foil bearing according to the invention provides a two-layer-system on the radial inner surface of the opening of the carrier element resulting in the following radial order from outside to the inside: a first bump foil layer, a first flat surface layer (also referred to a top foil). These layers are extending in a circumferential direction.

Another preferred embodiment of the invention provides at least one bump foil layer, which comprise several circumferentially extending stripes arranged axially next to each other. This design makes the gas foil bearing more adjustable to any static or dynamic misalignment of the shaft to be supported. The stiffness is reduced and the damping is improved by this partitioning of the bump foil layer.

A further preferred embodiment provides bump foil layers of different layer systems, which are identical. The identical bump foil layers can be designed such that the desired stiffness and damping characteristics are obtained by the combination of these bump foil layers and flat surface layers.

Basically it is possible to provide a foil system to be arranged on the radial inner side of the carrier element, wherein in alternating order bump foil layers and flat surface layers are stacked, wherein the top foil layer is flat surface layer.

It is further beneficial, to fixedly connect the bump foil layers and the flat surface layers both to the carrier element at only one circumferential end, while the other circumferential end is not fixedly connected to the carrier element. This connection to the carrier element can preferably be provided at the leading end in circumferential direction with regard to the direction of rotation of the shaft.

A preferred design of the radial gas foil bearing provides one segment to the 360° of circumference of the opening on the inner surface of the carrier element. The 360° circumference of the opening of the carrier element can also be divided into several segments. Doing so, preferably three segments are provided, wherein to each segment an angle of 120° is assigned. Each segment is preferably provided with more than one layer system extending from one circumferential end of the segment to the other circumferential end of the segment respectively.

A still further preferred embodiment of the invention provides a bump foil layer and/or a flat surface layer made of INCONEL. While INCONEL is only a registered trademark's name it is made predominantly of nickel, with chromium as a second element. Other metals made of predominantly nickel with chromium as a second element are suitable for the flat surface layer and/or the bump foil layer to be made of.

To enable the high accuracy need to effectively support the rotor said carrier element is made circumferentially rigid due to a circumferential continuous solid structure extending along the total circumference. One benefit from this rigidity is that at least two foils extending circumferentially along a radial inner side of said opening of said carrier element. In the prior art (U.S. Pat. No. 4,295,689A1) only one foil was enabled which limits the allowable bearing load significantly. To further improve accuracy and rigidity said radial through holes in the carrier ring at each specific circumferential position comprise at least one radial through hole being a hole of closed cylindrical shape. This means that said hole is limited and defined by the solid material of said carrier element totally.

Preferably the through hole(s) are made such that circumferentially connecting structures of the carrier ring—respectively the base material of the carrier ring—remain, respectively the profile is circumstantially closed.

The flaps and the through holes are made such that a fixation in all spatial three degrees of freedom to move is obtained. The flaps of the foils are made such that they can be stuck through the through holes to obtain a blocking of movement in axial and circumferential direction. Bending over a portion of the flap sticking out of the through hole accessible from the radial outer side of said carrier element is bend over such that a radial fixation of said foil is obtained.

A high modularity and flexibility according to the rotation direction is obtained when at least one of or a group of said through holes are made symmetrically according to a radial axial plane along the through hole center. Preferably, all of said through holes are made symmetrically in that way.

BRIEF DESCRIPTION

Some of the embodiments will be described in detail, with reference to the following figures, wherein like designations denote like members, wherein.

DETAILED DESCRIPTION

Figure 1:
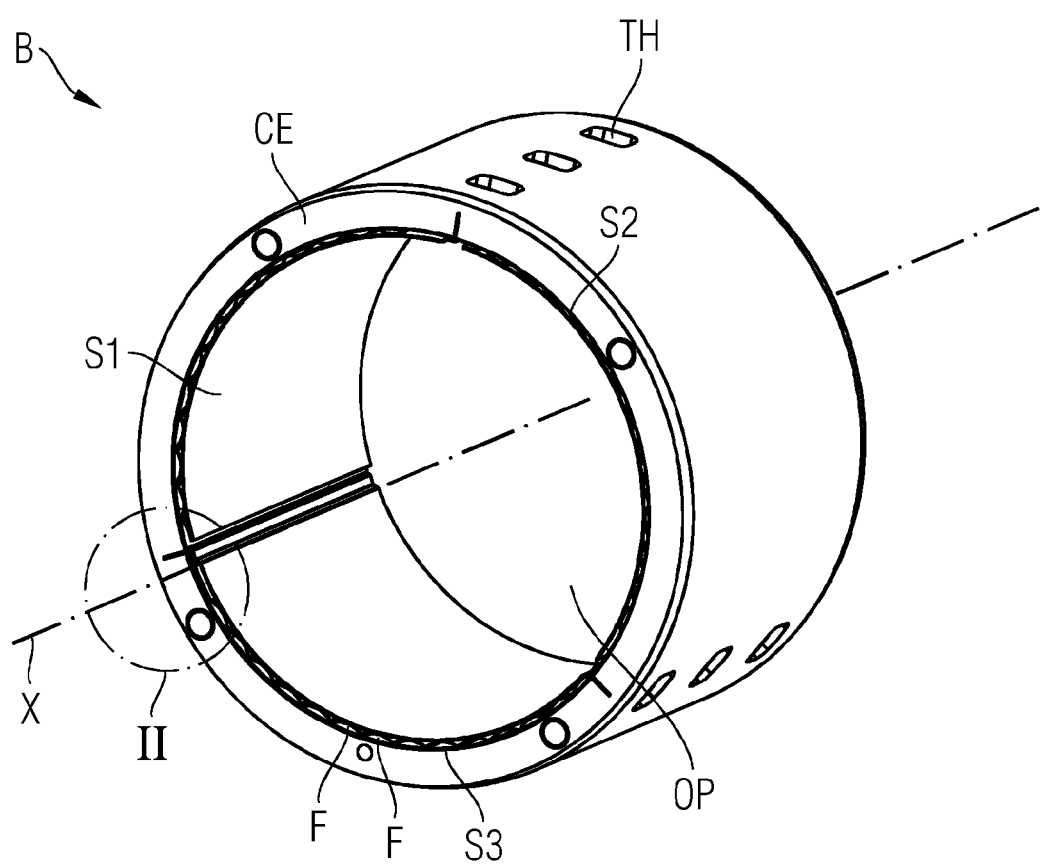
FIG. 1 shows a three-dimensional schematic depiction of an embodiment of a bearing.

FIG. 1 shows a bearing B according to embodiments of the invention, wherein said bearing B comprises a carrier element CE provided with a cylindrical opening OP extending along a central axis X. Said central axis X co-insides with a rotation axis of a rotor to be supported by said bearing B. All directional references refer to said central axis X is not indicated otherwise.

Figure 2:
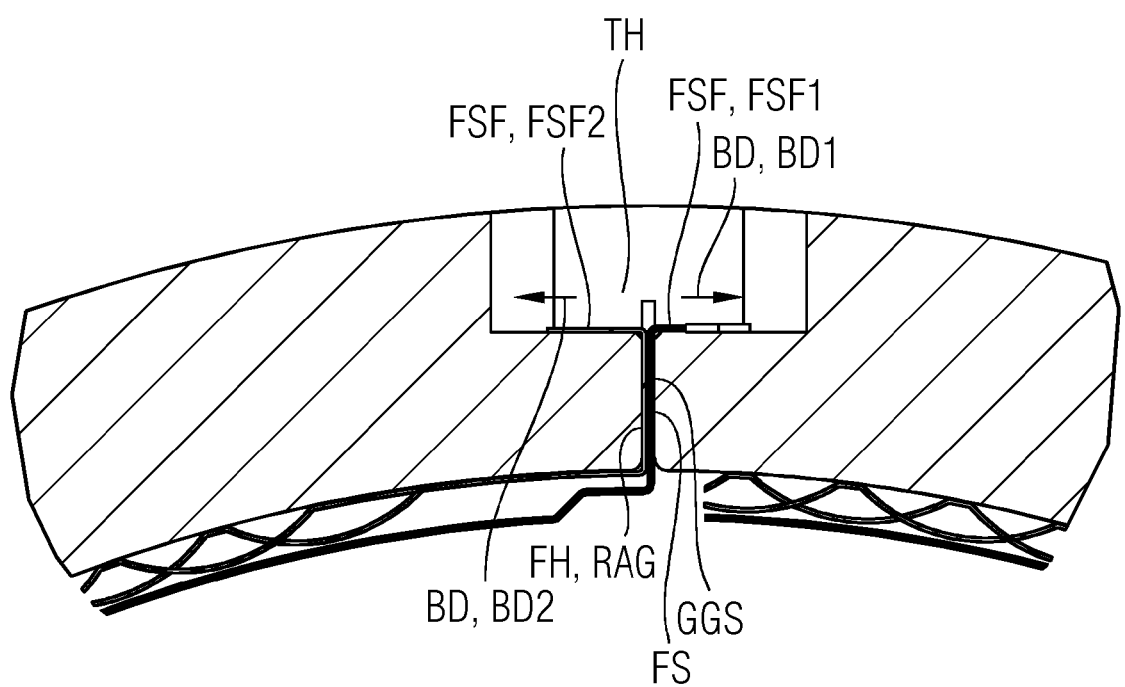
FIG. 2 shows an embodiment of a detail as referred to in FIG. 1 by II depicted as a cross section.
Figure 3:
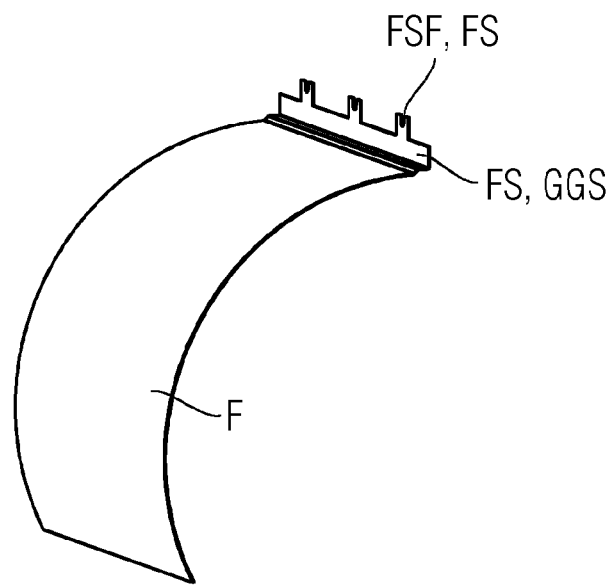
FIG. 3 shows a schematic, three-dimensional embodiment of a top foil layer of a foil to be inserted into the carrier element of the bearing.
Figure 4:
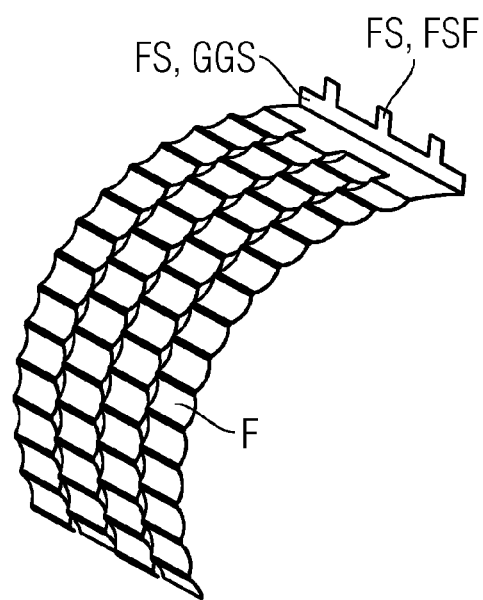
FIG. 4 shows a schematic, three-dimensional embodiment of a bump foil layer of a foil to be inserted into the carrier element of the bearing.

FIG. 2 shows a detail of FIG. 1 indicated by II and depicted as a cross sectional view and FIGS. 3 and 4 each show a foil F layer of the bearing B, wherein FIG. 3 shows a top foil layer and FIG. 4 a bump foil layer.

The bearing B is segmented into three circumferential segments S1, S2, S3, wherein each segment S1, S2, S3 extends along approximately 120° of the circumference. At one circumferential end of each foil layer system said foils F are inserted into a radially and axially extending groove RAG by a respective fixation section FS of said foil F. Said fixation section FS of said foil F comprises a groove guiding section GGS and fixation section flaps FSF. Said radial axial groove RAG joints into at least one through hole TH—here three through holes TH are provided per radial axial groove RAG. When said fixation sections FS are respectively inserted into said radial axial grooves RAG—respectively said through holes TH—said fixation section flaps FSF protrude through said through holes TH accessible from the radial outer surface of said carrier element CE. Due to the protrusion of said fixation section flaps FSF said foils F can be radially secured to said carrier element CE by bending over said fixation section flaps FSF into one circumferential bending direction BD from radial outside of said carrier element. In the depicted example each foil F comprises three fixation sections flaps FSF, wherein each of said fixation section flaps FSF is assigned to one through hole TH. The fixation section flaps FSF of each foil can be divided into two groups namely in fixation section flaps FSF1, which are bend into one circumferential direction respectively a first bending direction BD1 and in fixation section flaps FSF2, which are bend in a second bending direction BD2 opposite to the first bending direction BD1.

While said radial axial groove RAG secures said foil F in circumferential direction by means of said groove guiding section GGS said foils F are secured in radial direction by means of said fixation section flaps FSF.

The mounting procedure can easily be performed independently of the size of said bearing and rotor due to accessibility of said fixation sections from radially outside. Next to the reduction of the assembly effort the invention provides optimal operation safety due to safe locking of said foil layers to said carrier element CE.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" throughout this application does not exclude a plurality, and "comprising" does not exclude other steps or elements.

The invention claimed is:

1. A radial gas foil bearing extending along a rotation axis comprising:
    a carrier element provided with an opening extending along the rotation axis; and
    at least one foil extending circumferentially along a radial inner side of the opening of the carrier element, wherein the at least one foil is attached to the carrier element;
    wherein at least one radial through hole in the carrier element is provided, at least one fixation section of the at least one foil is formed to be inserted into the at least one radial through hole, the at least one fixation section and the at least one radial through hole are made such that the at least one fixation section becomes, by insertion into the at least one radial through hole, accessible from radial outside of the carrier element to be fixed to the carrier element.

2. The radial gas foil bearing according to claim 1, wherein the at least one fixation section comprises at least one fixation section flap, said the at least one fixation section flap protruding radially outside of the carrier element through the at least one radial through hole after the at least one fixation section flap is inserted into the at least one radial through hole, further wherein the at least one fixation section flap is bent into a bending direction in order to lock the at least one fixation section in the at least one radial through hole.

3. The radial gas foil bearing according to claim 2, wherein the bending direction is one circumferential direction.

4. The radial gas foil bearing according to claim 3, wherein the at least one foil comprises at least two fixation sections that includes a first fixation section and a second fixation section, further wherein a first fixation section flap of the first fixation section is bent in a first circumferential bending direction, and the second fixation section comprises a second fixation second flap, which is bent into an opposite circumferential bending direction.

5. The radial gas foil bearing according to claim 2, wherein the carrier element comprises at least one axially extending radial groove on a radially inner side of the opening, the axially extending radial groove radially joining into the at least one radial through hole wherein the at least one fixation section comprises a groove guiding section joining into the at least one fixation section flap, further wherein the groove guiding section fits into the axially extending radial groove such that the at least one foil is secured to the carrier element against movement in a circumferential direction.

6. The radial gas foil bearing according to claim 1, wherein the at least one fixation section flap is designed such that it is inserted into the at least one radial through hole with the at least one fixation section but locks the at least one fixation section radially in the at least one radial though hole after being bent over.

7. The radial gas foil bearing according to claim 1, wherein the carrier element is made circumferentially rigid due to a circumferential continuous solid structure extending along a total circumference.

8. The radial gas foil bearing according to claim 1, wherein the at least one foil comprises at least two foils extend circumferentially along a radial inner side of the opening of the carrier element.

9. The radial gas foil bearing according to claim 1, wherein the at least one radial through hole in the carrier element at a specific circumferential position comprises a hole of closed cylindrical shape.

10. The radial gas foil bearing according to claim 1, wherein the at least one radial through hole is made symmetrically according to a radial axial plane along a through hole center.

11. A method of assembling a radial gas foil bearing, comprising:
    providing the radial gas foil bearing that includes at least one foil extending circumferentially along a radial inner side of a carrier element, wherein the at least one foil is attached to the carrier element;
    providing at least one radial though hole of the carrier element;
    providing at least one fixation section of the at least one foil suitable to be inserted into the at least one radial though hole;
    inserting the at least one fixation element into the at least one radial though hole in order to make the at least one fixation element accessible from radial outside of the carrier element to be fixed; and
    securing the at least one fixation section from radially outside at the at least one radial though hole.

12. The method according to claim 11, wherein the at least one fixation section is fastened to the at least one radial through hole of the carrier element by bending over a fixation section flap.

13. The method according to claim 12, wherein the fixation section flap is bent over in a circumferential direction.

* * * * *